United States Patent [19]

Cizmecioglu

[11] Patent Number: 4,842,933
[45] Date of Patent: Jun. 27, 1989

[54] COMPOSITES WITH IMPROVED FIBER-RESIN INTERFACIAL ADHESION

[75] Inventor: Muzaffer Cizmecioglu, Pasadena, Calif.

[73] Assignee: California Institute of Technology, Pasadena, Calif.

[21] Appl. No.: 866,565

[22] Filed: May 21, 1986

[51] Int. Cl.[4] ............... D02G 3/00; B05D 1/18
[52] U.S. Cl. .................... 428/378; 427/407.1; 427/412; 427/443.2; 428/286; 428/288; 428/396
[58] Field of Search ........... 427/389.7, 389.8, 385.5, 427/443.2, 385.5, 407.1, 412; 428/286, 288, 378, 396

[56] References Cited

U.S. PATENT DOCUMENTS

| 4,130,465 | 12/1978 | Arai et al. | 427/387 X |
| 4,167,538 | 9/1979 | Taniguchi et al. | 427/387 X |
| 4,416,924 | 11/1983 | Peterson et al. | 427/389.8 X |
| 4,477,496 | 10/1984 | Das et al. | 427/389.8 X |
| 4,588,615 | 5/1986 | Otty | 427/389.8 X |
| 4,620,860 | 11/1986 | Werbowy | 65/3.4 |

OTHER PUBLICATIONS

Cheng, et al., SPE Journal, 26 No. 8 p. 62 (1970).
Kardos, et al., Polym. Engn. Sci., 13, 455 (1973).
Riess, et al., Proc. 2nd Carbon Fibers Conf., The Plastic Institute, p. 52 (1974).
Plueddemann, "Silane Coupling Agents", Plenum Press, N.Y. (1982).

Primary Examiner—Thurman K. Page
Attorney, Agent, or Firm—Marvin E. Jacobs

[57] ABSTRACT

The adhesion of fiber reinforcement such as high modulus graphite to a matrix resin such as polycarbonate is greatly enhanced by applying a very thin layer, suitably from 50 Angstroms to below 1000 Angstroms, to the surface of the fiber such as by immersing the fiber in a dilute solution of the matrix resin in a volatile solvent followed by draining to remove excess solution and air drying to remove the solvent. The thin layer wets the fiber surface. The very dilute solution of matrix resin is able to impregnate multifilament fibers and the solution evenly flows onto the surface of the fibers. A thin uniform layer is formed on the surface of the fiber after removal of the solvent. The matrix resin coated fiber is completely wetted by the matrix resin during formation of the composite. Increased adhesion of the resin to the fibers is observed at fracture. At least 65 percent of the surface of the graphite fiber is covered with polycarbonate resin at fracture whereas uncoated fibers have very little matrix resin adhering to their surfaces at fracture and epoxy sized graphite fibers exhibit only slightly higher coverage with matrix resin at fracture. Flexural modulus of the composite containing matrix resin coated fibers is increased by 50 percent and flexural strength by 37 percent as compared to composites made with unsized fibers.

14 Claims, 2 Drawing Sheets

COMPOSITES WITH IMPROVED FIBER-RESIN INTERFACIAL ADHESION

ORIGIN OF THE INVENTION

The invention described herein was made in the performance of work under a NASA contract, and is subject to the provisions of Public Law 96-517 (35 USC 202) in which the contractor has elected to retain title.

BACKGROUND OF THE INVENTION

The present invention relates to fiber-reinforced resin composites and, more particularly, this invention relates to graphite-fiber-polycarbonate resin composites having improved interfacial adhesion between the fiber and the matrix resin.

There is considerable interest in the use of fiber-reinforced resin composites due to their light weight and high strength. Graphite reinforced composites are finding increasing use in aircraft, spacecraft and space structures such as satellites and space stations. Due to the need to conserve fuel, the weight of automobiles is being reduced by increasing the use of plastics including fiber-reinforced plastics.

Thermoplastic polymers have become of particular interest for use in matrix resins in high performance fiber-resin composites for aerospace applications. They possess high impact resistance, high damage tolerance, high specific strength and modulus, fast processing cycles, and can have high thermal resistance. However, one important limiting factor in the use of these materials is their relatively low bond strength to reinforcing fibers, especially graphite fibers of high modulus.

It is well recognized that the fiber-matrix interface and the extent of bonding between matrix and fiber are of considerable importance to the overall properties and behavior of composites. Stress concentrations occur at the interface due to inevitable differences in the coefficients of thermal expansion, moduli, and Poisson ratios at the fiber and matrix resin. These stresses can lead to dewetting or crack formation along the interface, and, as a result, weaken the composite since the interfacial flaws act as stress concentrators. Since the transmission of applied stress between fiber and matrix depends on the integrity and characteristics of the interface or interphase, a considerable amount of work has been done over the years to understand the interface, to control it, and to modify or tailor it.

LIST OF REFERENCES

1. Edwin P. Plueddemann, "Silane Coupling Agents," Plenum Press, New York, 1982.
2. Kojiro Arai, Okayama, Noriaki Sugai, Fukuoka, "Treatment of Carbon Fibers," U.S. Pat. No. 4,130,465. Dec. 19, 1978.
3. I. Taniguchi, R. High, T. Iwatsuki and S. Ohuchi, U.S. Pat. No. 4,167,538, September, 1979.
4. G. Riess and M. Bourdeaux, M. Brie and G. Jonquet, Proc. 2nd Carbon Fibers Conf., The Plastics Institute, p. 52 (1974).
5. J. L. Kardos and F. S. Cheng, and T. L. Tolbert, Polym. Engn. Sci., 13, 455 (1973).
6. F. S. Cheng, J. L. Kardos and T. L. Tolbert, SPE Journal, 26 No. 8 p. 62 (1970).

DISCUSSION OF THE PRIOR ART

Silane coupling agents have been utilized to improve the interfacial bond as well as improve the environmental resistance of glass fiber reinforced plastics (4). The stress concentration at the interface can be reduced, and the structural properties of a composite can be changed through the incorporation of a material of finite thickness at the interface to form a so called "inner layer" (e.g., interphase) which may have a different composition, microstructure and properties. Arai et al (2) showed that both interlaminar shear strength and flexural strength of carbon fiber/epoxy composites increased by electrolytic polymerization of vinyl monomers onto the carbon fibers. Taniguchi et al (3) showed an improvement in flexural and shear strengths of carbon fiber/epoxy composite by the incorporation of a flexibilized epoxy at the interface. Riess et al (4) developed in interphase material with a poly(isoprene-b-(styrene-alt-maleic-anhydride) block copolymer. They showed an increase in both shear strength and impact toughness of epoxy-based composites. Kardos and Cheng (5) have shown that inner layers at the interface can also be generated in-situ in some certain thermoplastics, such as polycarbonate, which are amorphous in nature but can be made to crystallize under carefully controlled thermal conditions. Annealing of the composite for several hours results in the formation of a crystalline inner layer between the fiber and matrix. This resulted in observable increases in tensile strength and of graphite fiber/polycarbonate composites. However, annealing requires a long period to develop the in-situ formed crystalline interfacial layer. The treatment period is so long that an extremely long chamber would be required for processing continuous lengths of fiber. Even for batch process fiber, annealing requires the use of separate apparatus and energy to treat the composite after it is fabricated.

STATEMENT OF THE INVENTION

A method of greatly improving the interfacial adhesion of reinforcing fibers and matrix resin that does not require annealing is provided in accordance with the invention. The mechanical properties of the composite are substantially improved by a simple treatment of the fibers before embedding the fibers in resin. The flexural modulus is increased by over 50 percent and the flexural strength is increased by over 35 percent in a series of graphite fiber-polycarbonate samples. The fiber treatment method of the invention is much simpler and much less expensive to operate and can be carried out in a very short time period. The process is readily adaptable to continuous operation.

The properties of the fiber-reinforced composites are improved according to the present invention by applying a very thin coating of the matrix on the surface of the fibers of the resin before dispersing the fibers in the matrix resin. The thin layer is preferably formed by applying a solution to the surface of the fibers, suitably by immersing the fibers in a dilute solution which wets the surface of the fibers followed by evaporation of the solvent. The very dilute solution of resin is able to impregnate multifilament fibers. The solution flows evenly and completey over the surface of the filaments. A thin, even layer is formed after evaporation of the solvent. The presence of a thin, compatible layer of matrix resin enhances adhesion of the fiber to the surrounding matrix resin and is responsible for the excellent mechanical properties that are observed.

These and many other feature and attendant advantages of the invention will become apparent as the invention becomes better understood by reference to the following detailed description when considered in conjunction with the accompanying drawings.

DETAILED DESCRIPTION OF THE INVENTION

The layer of the resin must be very thin, from a monolayer (usually about 30–50 Angstroms) up to 1000 Angstroms, preferably below 250 Angstroms. The resin is most conveniently applied as a thin layer by immersing the fiber in a dilute solution of matrix resin in a vaporizable solvent having a concentration from about 0.1 percent by weight and below 1.0 percent by weight, usually from 0.1 to 0.2 percent by weight soluton. The resin must be soluble in solvent at this stage.

The resin can be a linear, uncross-linked, thermoplastic or thermosetting polymer. It can be a B-Stage of a resin that can be further advanced to a cross-linked stage by heat or catalyst activatable polyfunctional cross-linking agents. Resins that are suitable as the precoating and matrix resins are the high temperature, engineering chemoplastic resins such as polyurethane, polysulfane, polyether-imide, or thermosetting such as epoxies, ophenolics or polyesters and the unsaturated polyimides or polycarbonate resins.

The fiber reinforcement can be any of the fibers used to reinforce resins such as carbon, graphite, boron or synthetic polymeric fibers such as Kevlar (polyamide). The fiber should be free of sizing. The fiber can be in the form of a tow, a roving or a woven cloth. The process is applicable to high or low modulus fibers. The most advantageous application of the process is with high modulus graphite fibers having a modulus above $20 \times 10^6$ psi. Graphite fibers are formed by heating a precursor such as rayon, pitch or poly-acrylonitrile to carbonize the fibers followed by a high temperature (2000° C.–3000° C.) graphitization treatment under tension in the absence of oxygen during which it is believed that the carbon atoms are rearranged into a hexagonal structure. The fiber is usually prepared as fine filaments having a diameter from 6.0 to 15 microns which is twisted to form multifilament strands containing 100 to 10,000 filaments.

The coated fibers are dispersed in the matrix resin in an amount from 10 to 80 percent by weight, usually from 20 to 60 percent by weight. The fibers can be short, chopper fibers having a L/D ratio of over 20 or can be continuous lengths or sheets of fabric. The precoated fibers or fabric can be further impregnated with matrix resin to form a sheet of prepreg. The sheets of prepreg are then laid-up to form a laminated structure which is finally cured into a shaped article.

Figure 1:
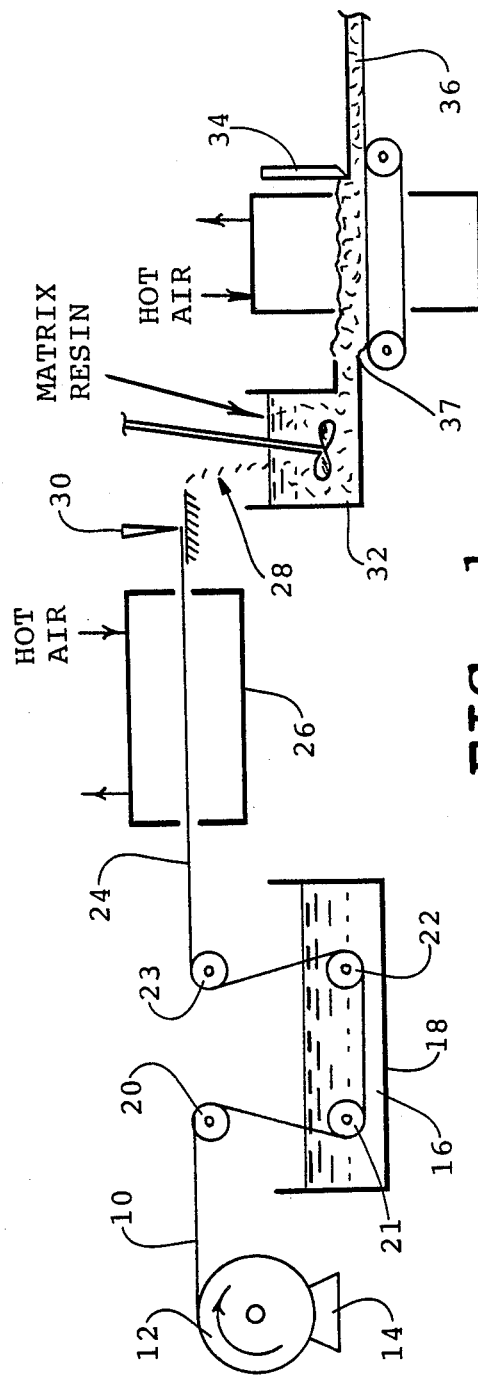
FIG. 1 is a schematic view of the apparatus for forming a composite in accordance with the invention.

A system for continuously forming precoated fiber composites according to the invention is illustrated in FIG. 1. A continuous length of fiber in the form of a multifilament tow 10 is unwound from the roll 12 on unwind stand 14. The filament passes through the dilute solution of resin 16 in the tank 18 guided by means of rollers 20, 21, 22, 23 for a time sufficient to apply the derived amount of resin. The coated length of fibers 24 is then passed through an oven 26 to remove solvent. The fibers can be rewound at this state. The fibers can be chopped into short lengths 28 by means of blade 30 and dispersed in matrix resin in the mixing kettle 32. The concentration of resin in the kettle is much higher than the solution on the tank 18. The fiber-resin mixture 37 is then dried in drier 39 before being extruded or cast by doctor blade 34 to form a sheet 36 of fiber-reinforced sheet molding compound (SMC) composite. Prepreg could be continuously formed by running the the matrix-coated fiber through a second tank containing a more concentrated solution of matrix resin followed by drying to remove solvent.

Figure 2:
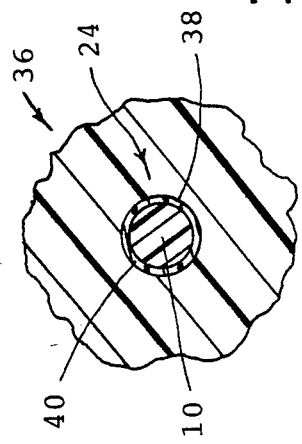
FIG. 2 is an enlarged cross section of a portion of the matrix showing the embedded, coated fiber.

Referring now to FIG. 2, the sheet 36 composite contains a dispersion of coated fibers 24 containing preformed layer 38 of matrix resin between the surface 40 of the fiber and the surrounding matrix resin 42. The matrix resin is a continuous phase containing discrete envelopes of preformed matrix resin surrounding each discrete fiber filler.

The invention will now be illustrated utilizing a polycarbonate. Polycarbonates are thermoplastic resins that are noncorrosive, resistant to chemicals and weather forces, nontoxic, strain resistant, self-extinguishing, have low water absorption, dimensional stability and good heat resistance. Graphite-reinforced polycarbonate resin composites are excellent materials for a wide range of engineering applications, particularly as structural members in civilian and military aircraft and space structures. Typical commercial polycarbonates such as Lexan are the linear polymer of carbonic acid formed by the catalytic condensation reaction of Bisphenol A with a carbonyl containing compound such as phosgene. The polymer has the following structure:

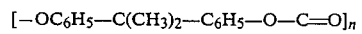

$$[-OC_6H_5-C(CH_3)_2-C_6H_5-O-C=O]_n$$

The matrix resin utilized in the following experiments was LEXAN polycarbonate obtained from General Electric. The graphite fiber used in this study was Hercules AS4 (modulus $34 \times 10^6$ psi) with an average filament diameter of the order of 8 microns. Both unsized and sized fibers were used, the latter containing an epoxy sizing.

The graphite fibers were cut by hand into 0.25 inch lengths from a tow. The resulting fluffs were then separated by placing them in a large container with a small hole in the cover. A blast of clean nitrogen through the hole set up turbulence in the container, whirling and separating the fibers.

The polycarbonate as obtained was in pellet form. In order to obtain a good mixing of the chopped fibers and the resin, the pellets were first converted into powder or flake form. This was done by dissolving the powdered resin in methylene-chloride to form a 4 percent by weight solution and then coagulating the solution in methanol under agitation. After washing, the flakes of polycarbonate were dried in a vacuum oven at 60° C. overnight.

The unsized graphite fibers were coated with a very dilute solution of matrix resin before preparing composite specimens. This was accomplished by immersing the chopped fibers in a 0.1 percent by weight solution of polycarbonate in methylene-chloride for one-half hour. The fibers were removed from the solution, drained and dried in an air-circulating oven at 65° C. for about an hour.

Thickness of the polycarbonate coating on the fibers was measured by weighing the fibers before and after treatment. The weight gain after coating was found to be 0.65 percent of the weight of the fibers. From the known length of the fibers and the amount of weight gain, the thickness of polycarbonate coating on the fibers was calculated to be 125 Angstroms.

The composite specimens were prepared by dispersing the appropriate amount of fiber to give 20 percent by weight in the mixture of a 75 percent methanol/25 percent water solution in a large beaker along with the polycarbonate powder (or flakes) under a mild agitation. A preformed mat of fibers, randomly dispersed and uniformly mixed with the resin powder, was then obtained from the suspension by filtering the solution on a Buechner. The mat was dried at 100° C. overnight in a vacuum oven. The mat was then compression molded using a dual-type mold (4½"×3"×1/16") between two ferro plates. Due to the possibility of losing some of the fibers during the preparation of composite specimens, the actual (or final) fiber content in the molded composite was measured. This was done by dissolving a known weight of composite specimen in methylene-chloride. Separated fibers were washed with methylene-chloride several times and the suspension was filtered to recover the fibers, which were dried in a vacuum oven until constant weight. Between three and five specimens were used for each composite. The three-point bending test results are normalized to a constant 20 weight percent fiber fraction, assuming that all properties are directly proportional to fiber content. The following molding conditions and temperature cycles were used:

The composite was held in the mold at 275° C. under pressure (5,000 psi) for 15 minutes. The heaters of the mold was then shut off and the molding was allowed to cool slowly to room temperature under pressure. Unfilled polycarbonate specimens and specimens with fibers sized by the manufacturer of the same geometry were also prepared under the same molding conditions as control samples.

Flexural strengths and moduli of the composites were determined at room temperature by a three-point bending test to fracture on an Instron, according to ASIM D-790. Specimens, 4½"×½"×1/16" were cut from the compression-molded sheets. Three to five specimens were used for each run and the results are reported as average values. The span length used was 2" and the rate of loading was 0.1 inches per minute.

The fractured surfaces of the composites resulting from the three-point bending tests were examined by Scanning Electron Microscopy to assess the degree of interfacial adhesion between the fiber and the matrix. The fracture surfaces were coated with a gold/platinum mixture before examination. X-ray diffraction analyses were carried out on the composites and the unit-cell spacings were measured on the resulting diffraction patterns.

The normalized flexural properties of the various composites and of control reinforced polycarbonates are shown in FIG. 1. Table 1 summarizes the corresponding flexural strengths, moduli and strain values for these composites.

SEM photomicrographs of fractured surfaces of the composite prepared from the fibers precoated from a very dilute solution of the matrix resin system showed the best results in terms of fiber-matrix adhesion among the composites prepared. Most of the fibers are almost completely enveloped by the resin, having been pulled out of the matrix during fracture with its coating of the resin relatively intact. The fiber ends, which were initially embedded in the matrix, were observed to be covered with resin, again indicating a better adhesion of the fibers to the matrix. Fibrilation of the matrix resin around and between the fibers can be noted.

TABLE I

| Flexural Properties of Short Graphite Fiber-Polycarbonate Composites. | | | | |
|---|---|---|---|---|
| MATERIALS | ACTUAL FIBER CONTENT % BY WT. | FLEXURAL STRENGTH (PSI) | FLEXURAL MODULES (PSI) | FLEXURAL MAX. STRAIN % |
| POLYCARBONATE (UNANNEALED) | NONE | $9.43 \times 10^3$ | $3.45 \times 10^5$ | >5 (YIELD) |
| POLYCARBONATE (ANNEALED, 245° C., 4 HRS) | NONE | $9.75 \times 10^3$ | $3.51 \times 10^5$ | >5 (YIELD) |
| A. UNANNEALED COMPOSITES | | | | |
| UNSIZED AS4/PC | 18.5 | $3.06 \times 10^4$ | $1.30 \times 10^6$ | 3.0 (YIELD) 3.4 (BREAK) |
| SIZED AS4/PC | 18 | $3.40 \times 10^4$ | $1.33 \times 10^6$ | 3.4 |
| IN-HOUSE PC COATED AS4/PC | 20 | $4.2 \times 10^4$ | $1.95 \times 10^6$ | 2.6 |
| B. ANNEALED COMPOSITES | | | | |
| UNSIZED AS4/PC (½ HR., 245° C.) | 20 | $3.20 \times 10^4$ | $1.49 \times 10^6$ | 2.6 |
| UNSIZED AS4/PC (1½ HRS., 245° C.) | 18 | $3.40 \times 10^4$ | $1.52 \times 10^6$ | 2.6 |
| UNSIZED AS4/PC (4 HRS., 245° C.) | 18.5 | $3.50 \times 10^4$ | $1.61 \times 10^6$ | 2.7 |

Figure 3:
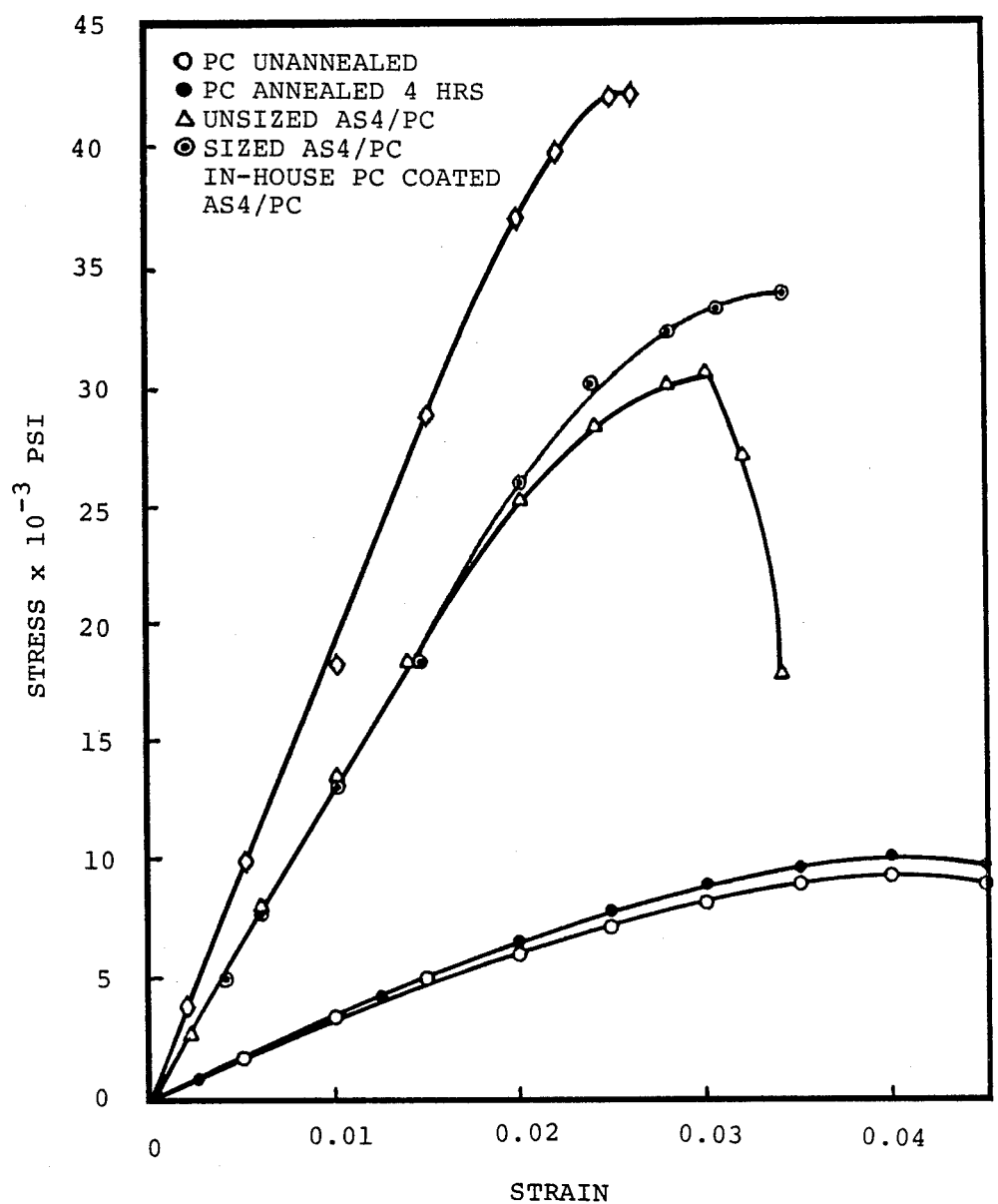
FIG. 3 is a series of curves showing normalized flexural stress-strain behavior of various composites and unreinforced poly-carbonate.

The control sample (unreinforced polycarbonate) did not break at room temperature under the three-point bending test. Extensive yielding was observed in both unannealed and annealed polycarbonate. The composite made with unsized graphite fibers did not break abruptly as seen in FIG. 3. At the maximum stress level, which is about 30 ksi, it was able to withstand the applied load without complete failure as evidenced by a gradual decrease of the slope of load versus deflection curves. This indicates that the failure mode for this composite is the one which is more likely a shear mode than a tensile mode, thus indicating the weak interfacial bonding. Whereas the composite made with graphite fibers sized by manufacturer showed a sudden break induced by a tensile failure mode, the flexural moduli of these two composites did not change in going from unsized fibers, although the flexural strength increased for composite made with sized fibers. The real effect of going from unsized to sized fibers is to change the failure modes exhibited by these two composites.

The composite containing coated fibers (with a thin layer of polycarbonates) showed excellent results. The flexural modulus was improved by 50 percent over that of the composite made with unsized fibers. Similarly, the flexural strength increased by about 37 percent. The failure was tensile mode with a sudden break indicating that the adhesion at the fiber-matrix interface was deepling enhancing. Composites made with the matrix resin precoated fibers show at least 65 percent coverage of the fibers with resin even after fracture failure of the composite whereas unsized fibers show less than 5 percent coverage and sized fibers, 15-20 percent coverage when tested under the same conditions. X-ray diffraction studies showed no crystallization of the layer of polycarbonate adjacent the fibers.

Scanning electron photomicrographs of the fractured surfaces of unsized AS4 fibers/polycarbonate composites show an interfacial separation, i.e., debonding of the fibers from the matrix as evidenced by the fact that essentially all exposed fibers are bare and by the existence of large voids/holes around the fibers. The imprints of the fibers which were pulled out from the matrix are also seen. As a result, the fiber-matrix adhesion in this composite is judged to be very poor.

SEM photomicrographs of fractured surfaces of sized AS4/polycarbonate composites showed a little better fiber-matrix adhesion as evidenced by coverage of about 15-20 percent of the fibers with the matrix resin and the interfacial failure observed in some areas.

SEM photomicrographs of fractured surfaces of the composite prepared from the fibers precoated from a very dilute solution of the matrix resin system showed the best results in terms of fiber-matrix adhesion among the unannealed composites prepared. From about 65-80 percent of the fibers are almost completely enveloped by the resin, having been pulled out of the matrix during fracture with its coating of resin relatively intact. The fiber ends, which were initially embedded in the matrix, were observed to be covered with resin, again indicating a better adhesion of the fibers to the matrix. Fibrilation of the matrix resin around and between the fibers can be noted.

Long term annealing is impractical to composite processing. Very good results in terms of improved mechanical properties and interfacial adhesion of fiber to matrix resin are achieved by applying a thin layer of the matrix resin to the surface of the fiber from a dilute solution of the matrix resin before dispersing the fibers in the matrix resin to forma composite. The layer app-4ears to improve wetting and bonding of the resin to the fiber.

It is to be realized that only preferred embodiments of the invention have been described and that numerous substitutions, modifications, and alterations are permissible without departing from the spirit and scope of the invention as defined in the following claims.

I claim:

1. A method for improving the the interfacial adhesion of a thermoplastic matrix resin to fiber in a composite comprising the steps of:
    applying a dilute solution of the matrix resin in volatile solvent to the fibers and drying the fibers to remove the solvent to form a thin layer of a matrix resin having a thickness of from a monolayer to 1000 Angstroms on the fibers before dispersing the matrix-resin coated fibers in a further amount of matrix resin to form a composite, whereby at least 65 percent of the surface of said fibers are coated with the matrix resin at the time of fracture of the composite.

2. A method according to claim 1 in which the layer has a thickness from 50 Angstroms to 250 Angstroms.

3. A method according to claim 2 in which the solution has a concentration 0.1 to 0.2 percent by weight.

4. A method according to claim 3 in which the matrix resin is an uncross-linked thermoplastic resin at the time the resin is applied to the fiber to form a layer.

5. A method according to claim 4 in which the resin is a polycarbonate.

6. A method according to claim 1 in which the fiber is selected from carbon fiber or graphite fiber.

7. A method according to claim 6 in which the fiber is graphite.

8. A method according to claim 7 in which the graphite fiber is a high modulus material having a modulus above $20 \times 10^6$ psi.

9. A method according to claim 8 in which the fibers have a diameter from 6 to 15 microns and an L/D ratio of at least 20.

10. A method according to claim 1 further including the step of dispersing the matrix resin coated fiber in a body of matrix resin in an amount from 10 to 80 percent by weight of the fiber to form a composite.

11. A composite prepared according to the method of claim 1.

12. A composite comprising a dispersion of:
    10 to 80 percent by weight of high modulus graphite fibers in matrix resin said fibers containing a precoated layer having a thickness from a monolayer to 1000 Angstrom thick of said matrix resin in thermoplastic form and at least 65 percent of the surface of said fibers being coated with the matrix resin at the time of fracture.

13. A composite according to claim 12 in which the matrix resin is a polycarbonate graphite fiber.

14. A method according to claim 8 in which the fiber is a multifilament fiber and the dilute solution impregnates and coats the filaments of the fibers.

* * * * *